US009630447B2

(12) United States Patent
Yoshino et al.

(10) Patent No.: US 9,630,447 B2
(45) Date of Patent: Apr. 25, 2017

(54) FRICTIONAL PROPULSION DEVICE AND OMNI-DIRECTIONAL VEHICLE

(71) Applicant: HONDA MOTOR CO., LTD., Minato-ku, Tokyo (JP)

(72) Inventors: Tsutomu Yoshino, Wako (JP); Wataru Yada, Wako (JP); Makoto Hasegawa, Wako (JP); Shinichiro Kobashi, Wako (JP); Jun Inada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/099,139

(22) Filed: Apr. 14, 2016

(65) Prior Publication Data

US 2016/0303900 A1   Oct. 20, 2016

(30) Foreign Application Priority Data

Apr. 16, 2015   (JP) .................................. 2015-084150

(51) Int. Cl.
| B60B 19/00 | (2006.01) |
| B62K 1/00 | (2006.01) |
| B60B 19/12 | (2006.01) |
| B60B 27/00 | (2006.01) |
| B60K 1/02 | (2006.01) |
| B62K 11/00 | (2006.01) |

(52) U.S. Cl.
CPC ............ B60B 19/003 (2013.01); B60B 19/12 (2013.01); B60B 27/0005 (2013.01); B60K 1/02 (2013.01); B62K 1/00 (2013.01); B62K 11/007 (2016.11)

(58) Field of Classification Search
CPC ..... B60B 19/003; B60B 19/12; B60B 19/125; B62K 11/007; B62K 1/00; B62D 21/02
See application file for complete search history.

(56) References Cited

U.S. PATENT DOCUMENTS

| 8,342,270 B2 | 1/2013 | Takenaka et al. |
| 8,567,535 B2 * | 10/2013 | Takenaka ................. B62K 1/00 180/21 |
| 8,708,068 B2 | 4/2014 | Yada |

(Continued)

FOREIGN PATENT DOCUMENTS

| JP | 2011-063209 A | 3/2011 |
| JP | 2013-107575 A | 6/2013 |

(Continued)

*Primary Examiner* — Drew J Brown
(74) *Attorney, Agent, or Firm* — Carrier Blackman & Associates, P.C.; Joseph P. Carrier; William D. Blackman (57) ABSTRACT

In a frictional propulsion device comprising a main wheel including a plurality of driven rollers rotatably supported by an annular core member about a tangential direction and a pair of drive disk each carrying a plurality of drive rollers about a rotational center line at an angle with respect to both a tangential line of the drive disk and the rotational center line of the drive disk such that the drive rollers at least partly engage the driven rollers, a diameter of a drive side contact circle is smaller than a diameter of a driven side contact circle, and the drive disks are vertically offset relative to the main wheel so that only those drive rollers adjoining the main wheel are in contact with the driven rollers. Thereby, the power efficiency of the device can be improved while minimizing the manufacturing cost and the weight of the device.

9 Claims, 6 Drawing Sheets

(56) References Cited

U.S. PATENT DOCUMENTS

| | | | | |
|---|---|---|---|---|
| 2011/0070997 A1* | 3/2011 | Gomi | ............ | B60B 9/06 |
| | | | | 476/66 |
| 2012/0032496 A1* | 2/2012 | Takenaka | ............ | B60B 19/003 |
| | | | | 301/5.23 |
| 2014/0353051 A1* | 12/2014 | Yada | ............ | B62K 11/007 |
| | | | | 180/6.2 |
| 2015/0129327 A1* | 5/2015 | Yoshino | ............ | B60B 19/003 |
| | | | | 180/6.5 |
| 2016/0304163 A1* | 10/2016 | Yoshino | ............ | B60B 19/003 |

FOREIGN PATENT DOCUMENTS

| | | |
|---|---|---|
| JP | 2013-237327 A | 11/2013 |
| WO | 2008/132779 A1 | 11/2008 |

* cited by examiner

FRICTIONAL PROPULSION DEVICE AND OMNI-DIRECTIONAL VEHICLE

TECHNICAL FIELD

The present invention relates to a frictional propulsion device and an omni-directional vehicle, and in particular to a frictional propulsion device that can be favorably used in an omni-directional vehicle and an omni-directional vehicle equipped with such a frictional propulsion device.

BACKGROUND ART

A known frictional propulsion device for an omni-directional vehicle comprises a main wheel including an annular core member and a plurality of driven rollers (free rollers) fitted on the annular core such that each driven roller may be freely rotatable around the tangential direction of the annular core member at the corresponding position, and a pair of drive disks provided on either side of the main wheel each including a disk member and a plurality of drive rollers (free rollers) arranged along the outer periphery of the disk member and engaging the driven rollers of the main wheel so as to be each rotatable around a rotational center line at an angle to both the lateral direction and the radial direction. See W008/132779A, JP2013-237327, JP2011-63209A and JP2013-107575A, for instance.

In the disclosed frictional propulsion devices, the drive disks are rotatably supported by the body frame of the omni-directional vehicle and are individually actuated by separate electric motors so that the vehicle can be propelled in the fore and aft, oblique and lateral directions. In the prior art disclosed in W008/132779A and JP2013-237327, the electric motors are positioned above the main wheel, and the power of the electric motors are transmitted to the respective drive disks by belt transmission mechanism. In the prior art disclosed in JP2011-63209A and JP2013-107575A, the electric motors are disposed coaxially to the drive disks so that the power of the electric motors are directly transmitted to the respective drive disks via respective shafts.

When the electric motors are positioned above the main wheel, the gravitational center of the vehicle is located at a relatively high position, and the overall height of the vehicle is inevitably great. When the electric motors are provided coaxially with respect to the drive disks, the gravitational center may be lowered, and the overall height of the vehicle may be reduced, but a gear reduction system of a high gear ratio and a compact design is required in view of minimizing the lateral dimension of the motor/gear reduction system assembly. Such gear reduction systems may be available but are costly and/or may lack the desired durability.

BRIEF SUMMARY OF THE INVENTION

In view of such problems of the prior art, a primary object of the present invention is to provide a frictional propulsion device that can lower the gravitational center of the device and reduce the overall height of the device without requiring a complex and/or costly gear reduction system.

A second object of the present invention is to provide a frictional propulsion device which can minimize not only the vertical dimension but also the lateral dimension of the device.

A third object of the present invention is to provide an omni-directional vehicle equipped with such a frictional propulsion device.

To achieve such objects, the present invention provides a frictional propulsion device, comprising: a frame (10); a main wheel (30) including an annular core member (32) having a laterally extending central axial center line and a plurality of driven rollers (60) each rotatably supported on the annular core member about a tangential line of the annular core member; a support shaft (20) supported by the frame and extending laterally across a hollow interior of the main wheel; a pair of drive disks (70) rotatably supported by the support shaft on either side of the main wheel, the drive disks being individually rotatable around a central axial line (A) common to the support shaft; a plurality of drive rollers (78) arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel; a drive unit (84) mounted on the frame; and a transmission mechanism (80, 86, 88) for transmitting power from the drive unit to the drive disks individually; wherein a diameter (D1) of a drive side contact circle defined by points on the drive disk at which the drive rollers contact the driven rollers is smaller than a diameter (D2) of a driven side contact circle defined by the points on the main wheel at which the driven rollers contact the drive rollers, and the drive disks are vertically offset relative to the main wheel so that only those drive rollers adjoining the main wheel are in contact with the driven rollers; and wherein the drive unit is positioned in a crescent shaped space (C) defined between an outer peripheral part of the drive disks and an inner peripheral part of the main wheel as seen from a side.

Because the space created between the drive disks and the main wheel can be conveniently used for accommodating the drive unit which may include two electric motors, the gravitational center of the frictional propulsion device can be lowered, and the overall height can be minimized.

Preferably, the drive unit includes a pair of electric motors (84) which are angularly offset relative to each other about the central axial line of the drive disks.

According to this arrangement, the lateral dimension of the drive unit can be minimized by positioning the electric motors so as to overlap each other as seen in front view.

Preferably, the electric motors are positioned symmetric to each other about a line connecting the central axial lines of the main wheel and the drive disks.

Thereby, the electric motors can be favorably balanced in the fore and aft direction so that the stability of the frictional propulsion device can be enhanced.

Preferably, the electric motors are positioned on a line connecting the central axial lines of the main wheel and the drive disks.

Thereby, the space efficiency can be improved, and the electric motors can be favorably balanced in the fore and aft direction so that the stability of the frictional propulsion device can be enhanced.

According to a preferred embodiment of the present invention, the transmission mechanism includes a small pulley (86) fitted on an output shaft of each electric motor (84), a large pulley (80) coaxially fitted on the corresponding drive disk and a belt (88) passed around the two pulleys.

Thus, the electric motors, the drive pulleys, the driven pulleys and the belts of the right and left drive systems may consist of common component parts.

The frictional propulsion device may further comprise a guide member (102, 110) supported by the frame for engaging the driven rollers that are not in contact with the drive rollers against yaw and/or roll movement of the main wheel relative to the frame.

Although the driven rollers in the upper part of the main wheel are not interposed between the drive rollers from either side, the guide member prevents the main wheel from undergoing a roll movement or a yaw movement relative to the frame.

According to a preferred embodiment of the present invention, the guide member includes an arm (106) rotatably supported by the support shaft or the frame around the central axial line of the support shaft and at least one free roller (110) supported by the arm and making a rolling contact with the driven rollers on the main wheel.

Thereby, the driven rollers of the main wheel that are not engaging the ground or engaged by the drive rollers can be retained by the at least one free roller so that the main wheel can be favorably prevented from undergoing an undesired roll and/or yaw movement.

When the arm extends away from the central axial line of the support shaft in two opposite directions, and at least one free roller is provided on each terminal end of the arm, the at least one free roller is prevented from being pressed against the driven rollers with an excessive pressure.

According to the present invention, because the power unit is received in the crescent shaped space defined within the main wheel, the gravitational center of the frictional propulsion device can be lower, and the overall height of the frictional propulsion device can be minimized without requiring any special, expensive reduction gear mechanism.

DESCRIPTION OF THE PREFERRED EMBODIMENT(S)

A preferred embodiment of the present invention is described in the following with reference to FIGS. 1 to 5.

Figure 1:
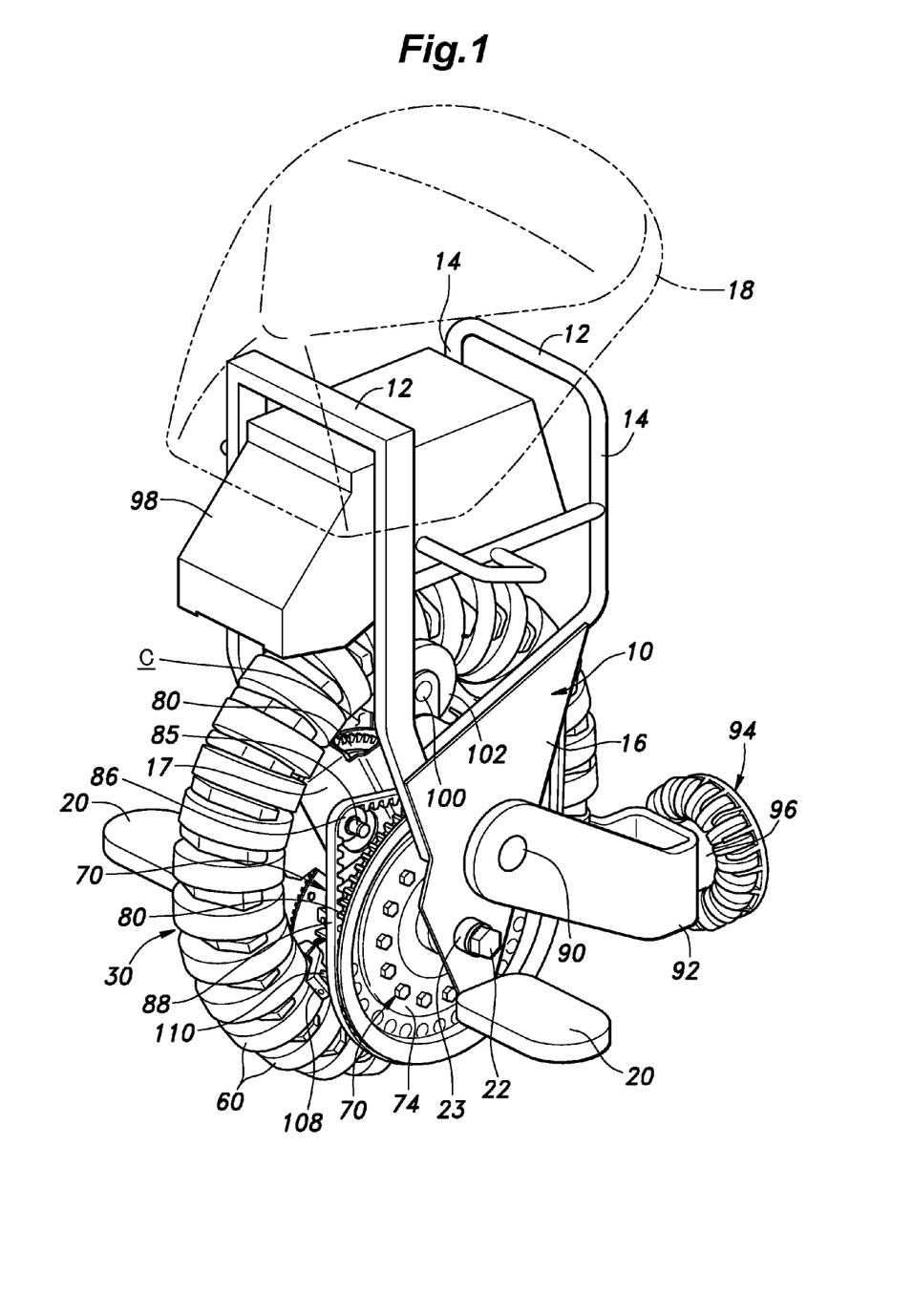
FIG. 1 is a perspective view of an omni-directional vehicle of an inverted pendulum type using a frictional propulsion device according to the present invention.

As shown in FIG. 1, the inverted pendulum vehicle of the illustrated embodiment (omni-directional vehicle) comprises a vehicle body frame 10. The vehicle body frame 10 comprises a pair of upper cross members 12, and a pair of side leg members 14 each having a pair of bifurcated upper parts connected to the lateral ends of the corresponding cross members 12, respectively, and a lower part connected to a triangular lower support plate 16 extending along either side of the vehicle. The upper cross members 12 support a saddle 18 for seating the rider, and each lower support plate 16 is fitted with a foot rest 20 for supporting the corresponding foot of the rider.

A main wheel 30 and a pair of drive disks 70 flanking the main wheel 30 are disposed between the lower parts of the two leg members 14 or the lower support plates 16.

Figure 2:
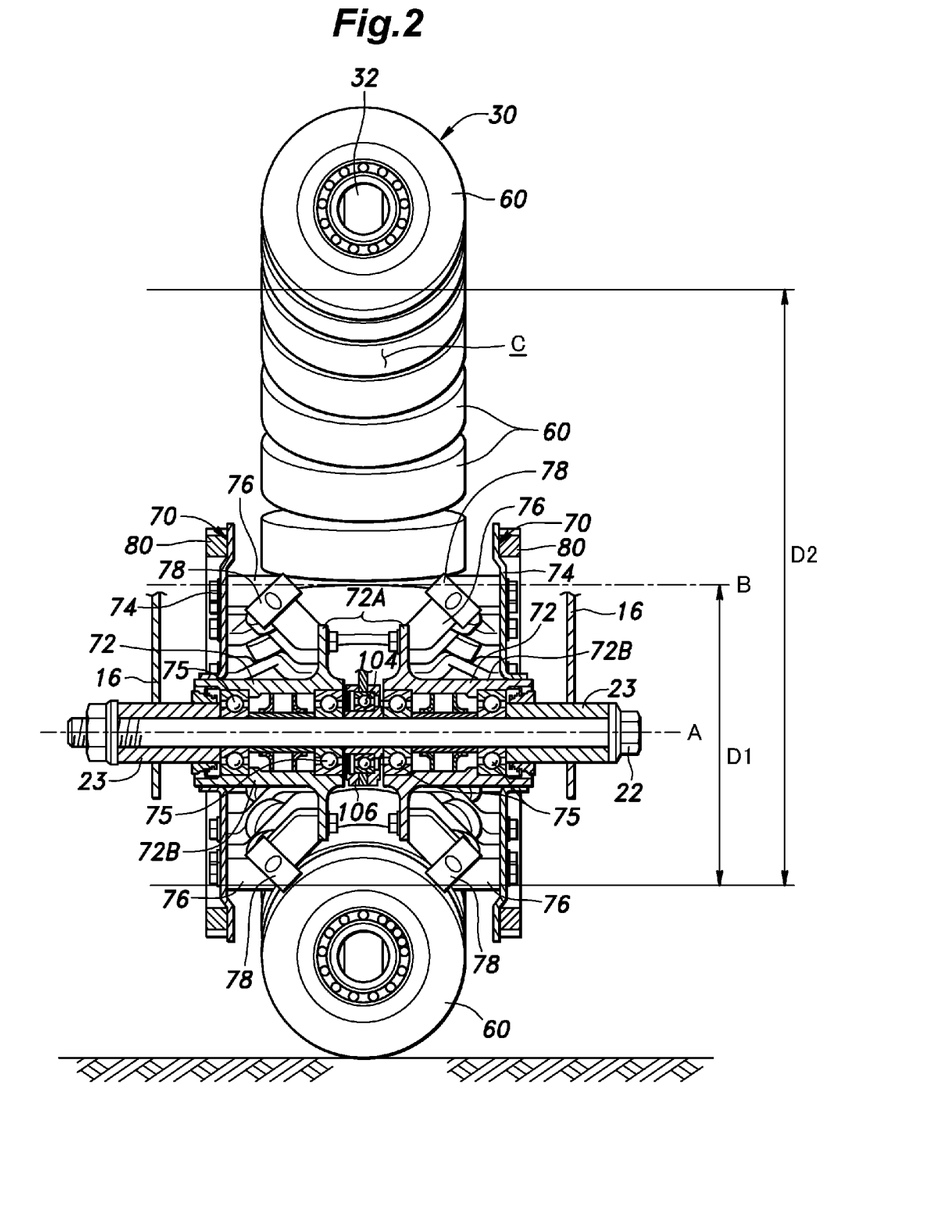
FIG. 2 is a sectional front view of the frictional propulsion device.
Figure 3:
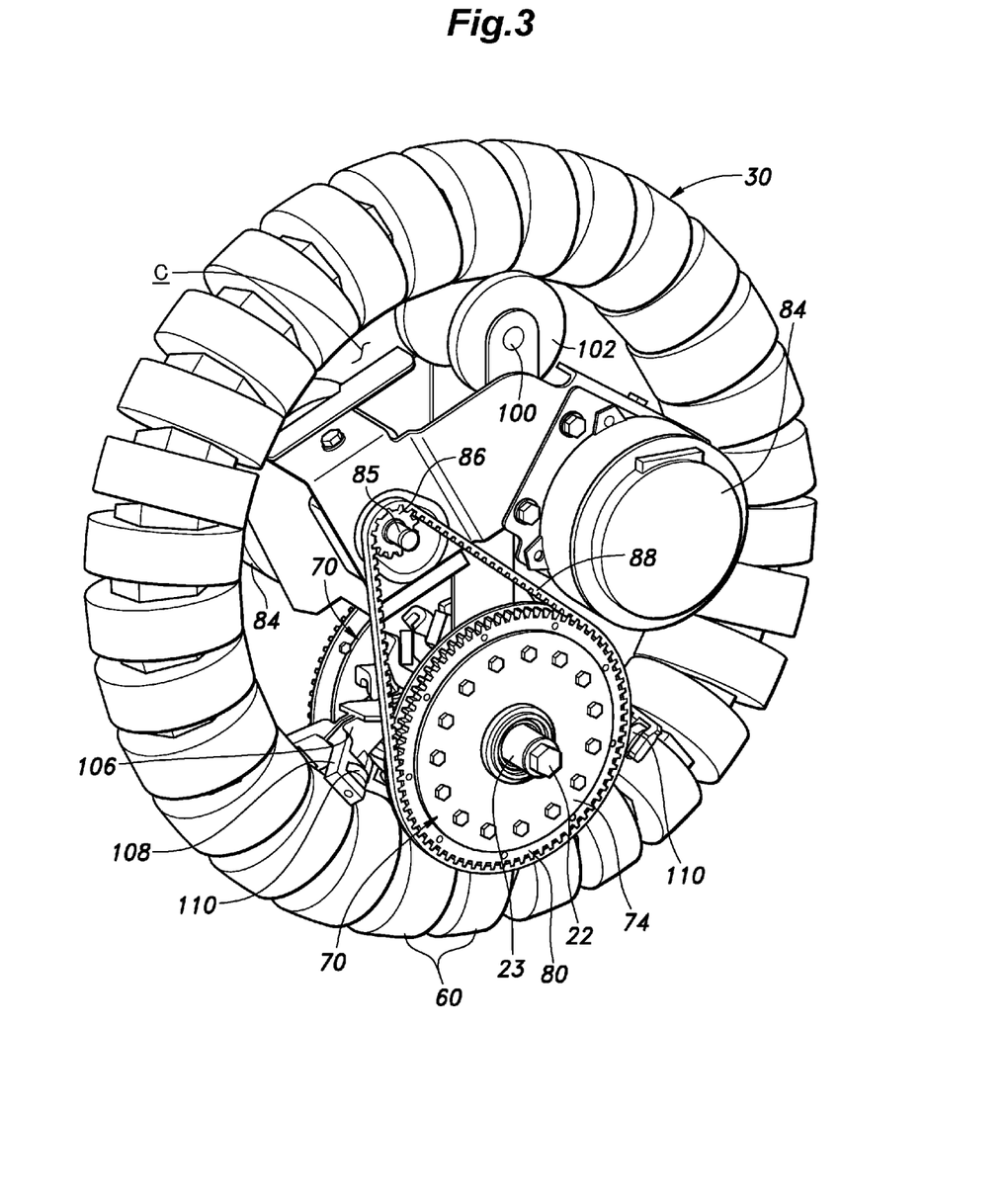
FIG. 3 is a perspective view of the frictional propulsion device.

As shown in FIGS. 1 to 3, the main wheel 30 includes an annular core member 32 having a central axial line B extending laterally (horizontally) and a plurality of driven rollers (free rollers) 60 fitted on the annular core member 32 like beads of a rosary. Each driven roller 60 is rotatable around the tangential line of the annular core member 32 at the point where the particular driven roller 60 is located.

As shown in FIGS. 2 and 3, the two drive disks 70 are symmetric to each other about the central major plane of the main wheel 30, and are each provided with a hub 72 and a disk member 74 connected coaxially and outboard to the hub 72. Each hub 72 includes a cylindrical part 72B and a radial flange 72A extending radially outward from the part of the cylindrical part 72B adjoining the inboard end thereof. A pair of such hubs 72 are arranged symmetric to each other about the main wheel 30, and are each configured similar to the hub of a motorcycle. A plurality of drive roller holders 76 are provided between the radial flange 72A of the hub 72 and the outer peripheral part of the disk member 74, and are arranged along a circle concentric to the support shaft 22. A drive roller (free roller) 78 is rotatably supported between each pair of adjoining holders 76 around a rotational center line which is at an angle to both the radial direction and the lateral direction.

Each lower support plate 16 is fixedly fitted with a sleeve 23 which in turn fixedly supports the corresponding end of the support shaft 22. The support shaft 22 is passed though the hollow interior of the two hubs 72, and support the hubs 72 individually via ball bearings 75, respectively. In other words, the body frame 10 supports the two hubs 72 and hence the drive disks 70 in a rotatable manner around the common central axial line A. This central axial line A is in parallel with the central axial line B of the main wheel 30.

Here, an imaginary circle defined by the points on the drive disk 70 at which the drive rollers 78 contact the driven rollers 60 is called as a drive side contact circle, and an imaginary circle defined by the points on the main wheel 30 at which the driven rollers 60 contact the drive rollers 78 is called as a driven side contact circle.

In the illustrated embodiment, the diameter D1 of the drive side contact circle is smaller than the diameter D2 of the driven side contact circle. Also, as the drive disks 70 are supported by the common support shaft 22 extending laterally (horizontally), the plane of the drive side contact circle is in parallel with the plane of the driven side contact circle.

Because D1<D2, the drive disks 70 are radially (vertically) offset from the main wheel 30 so that only those drive rollers 78 adjoining the driven rollers 60 are in contact with the driven rollers 60. In other words, as the central axial line A of the drive disks 70 is downwardly offset relative to the central axial line B of the main wheel 30, only those drive rollers 78 which are located in a lower part of the drive disks 70 engage those driven rollers 60 located in a lower part of the main wheel 30. In this case, the drive rollers 78 and the driven rollers 60 are disposed in a symmetric relationship about a vertical line passing through the road contact point of the main wheel 30 when viewed from sideways. This is advantageous because only those driven rollers 60 engaging the road surface are effective in propelling the vehicle, and only those drive rollers 78 effective in driving the driven rollers 60 engaging the road surface are required to be driven while the remaining drive rollers 78 not contributing to the propulsion of the vehicle are left idle without consuming any energy.

The drive rollers 78 engaging the driven rollers 60 of the main wheel 30 are urged downward or against the driven rollers 60 under the weight of the vehicle and the rider seated on the saddle 18. Typically, one or two of the driven rollers 60 of the main wheel 30 engage the road surface, but when the loading is great, three or more of the driven rollers 60 may engage the road surface owing to the elastic deformation of the driven rollers 60.

Because D1<D2, and the drive disks 70 are offset downward relative to the main wheel 30, as shown in FIGS. 1 to 3, a crescent shaped space C is defined between the upper side of the drive disks 70 and the opposing (downwardly facing) inner periphery of the main wheel 30 as seen from a side.

A support frame 17 is positioned in this crescent shaped space C, and is connected to the body frame 10. As the crescent shaped space C is open on either side, the support frame 17 can be connected to the body frame 10 without being hindered by any component parts.

Figure 4:
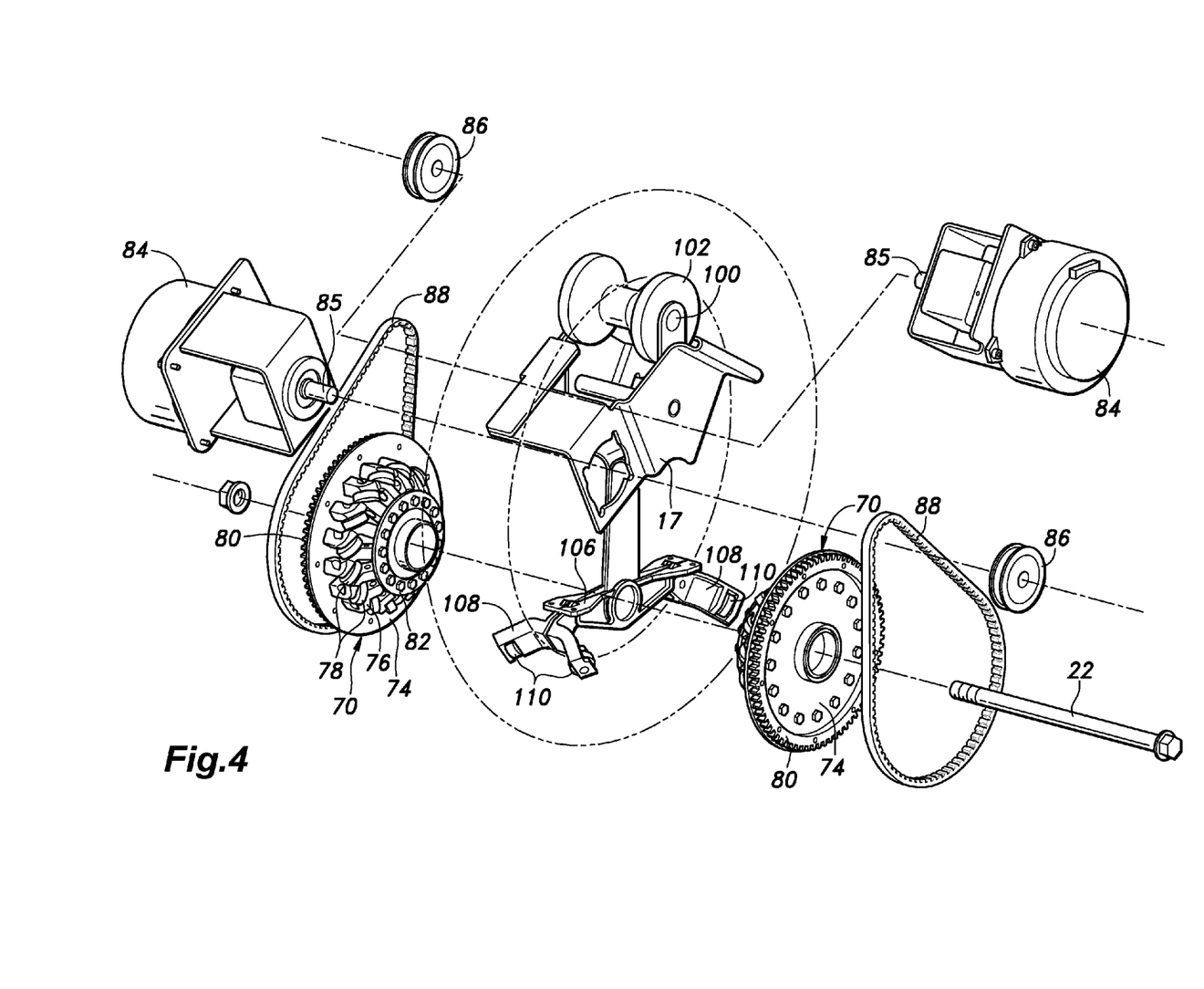
FIG. 4 is an exploded perspective view of the frictional propulsion device.

As shown in FIGS. 3 and 4, the body frame 10 is provided with an upper shaft 100 which extends laterally through the main wheel 30 in an upper part of the crescent shaped space C, and supports an hourglass shaped idler roller 102 in a freely rotatable manner. The idler roller 102 is located on a vertical line passing through the ground engaging point P of the main wheel 30. The idler roller 102 is provided with a narrow intermediate part, and a progressively increasing diameter toward either lateral end thereof. The narrow intermediate part of the idler roller 102 engages the upper part of the inner periphery of the main wheel 30. Thereby, the main wheel 30 is restrained against a roll movement thereof or prevented from tilting sideways. The driven rollers 60 engaged by the idler roller 102 are idle so that substantially no frictional resistance is caused by the idler roller 102. If desired, a biasing spring (not shown in the drawings) may be provided on the body frame 10 so that the idler roller 102 may be resiliently urged against the driven rollers 60 in the uppermost part of the main wheel 30.

As shown in FIGS. 2 to 4, the central part of the support shaft 22 rotatably supports a middle part of an arm 106 via a ball bearing 104, between the opposing ends of the cylindrical parts 72B of the two hubs 72. The arm 106 extends in the both forward and rearward directions from the central part thereof, and the forward and rearward ends of the arm 106 are each bifurcated into a pair of arcuate arm ends extending in the longitudinal direction on either side of the central plane of the main wheel 30 so that the arm 106 has the shape of letter H in plan view. Each arm end is provided with a roller holder 108 that holds a free roller (guide roller) 110 engaging the inner periphery of the main wheel 30. Thus, the free rollers 110 engage those driven rollers 60 that are located in a forward and a rearward part of the inner periphery of the main wheel 30, from either side at an angle in each part, and in particular to those driven rollers 60 that are adjacent to the driven rollers 60 engaged by the drive rollers 78 and engaging the road surface, and are therefore idle.

The main wheel 30 is thus supported by the two sets of drive rollers 78 and the free rollers 110 at the lower part thereof on either side against lateral and yaw movements and by the idler roller 102 at the upper end thereof against lateral movement so that the main wheel 30 can be maintained in the upright attitude without wobbling either in the lateral direction, in the roll direction or in the yaw direction. Furthermore, when the body frame 10 is lifted off the ground, the idler roller 102 prevents the main wheel 30 from sagging down from the body frame 10.

A driven pulley 80 is attached to the outer periphery of each disk member 74 in a concentric relationship. The driven pulley 80 in this case consists of a toothed pulley, but may also consist of a regular V-pulley, flat pulley or a sprocket wheel. The support frame 17 supports a pair of electric motors 84 each internally provided with a gear reduction device. The two electric motors 84 are positioned within the crescent shaped space C in an angularly offset relationship relative to each other about the central axial line A, and output shafts 85 of these electric motors 84 extend toward each other in parallel with the central axial line A, and are each fitted with a drive pulley 86 having a smaller diameter than the corresponding driven pulley 80.

Figure 5:
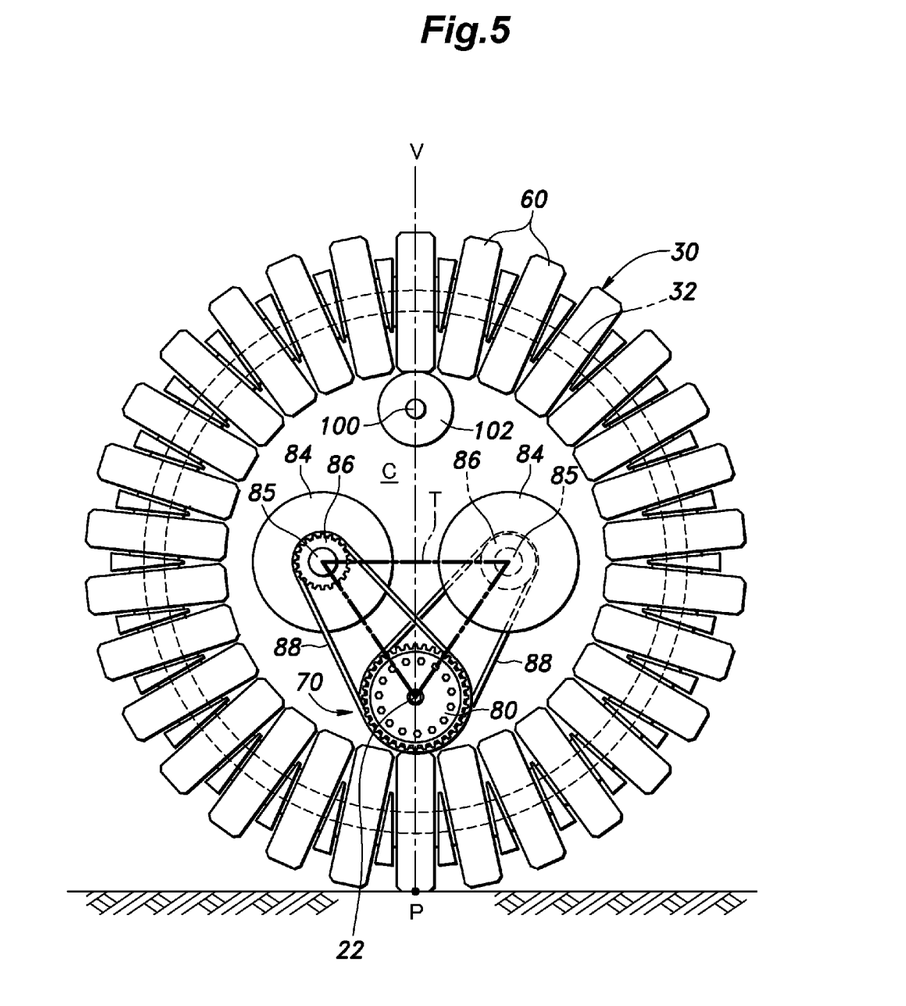
FIG. 5 is a side view of an essential part of the frictional propulsion device.

As shown in FIG. 5, when viewed from a side, the electric motors 84 are positioned symmetric to a vertical line extending between the road contact point P of the main wheel 30 and the center of the drive disks 70. Therefore, the centers of the electric motors 84 and the center of the drive disks 70 are positioned on the vertices of an isosceles triangle with a vertical axis of symmetry. The bottom side extending between the centers of the electric motors 84 extends horizontally.

The electric motors 84 may project from either side of the crescent shaped space C in front view, but is confined within the crescent shaped space C in side view.

An endless cogged belt 88 is passed around each drive pulley 86 and the corresponding driven pulley 80 in a torque transmitting relationship so that the two drive disks 70 may be individually and rotatively actuated by the respective electric motors 84.

Owing to the symmetric positioning of the electric motors 84, the distance between the support shaft 22 and the output shaft 85 of one of the electric motors 84 is equal to the distance between the support shaft 22 and the output shaft 85 of the other electric motors 84 so that the electric motors 84, the drive pulleys 86, the driven pulleys 80 and the belts 88 of the right and left drive systems may consist of common component parts.

As shown in FIG. 1, a tail wheel arm 92 consisting of a bifurcated yoke member is pivotally supported by the lower support plates 16 at the bifurcated base ends via a pivot shaft 90 thereof extending laterally so that the tail wheel arm 92 may be tilted vertically about the base end thereof. The rear end or the free end of the tail wheel arm 92 supports a tail wheel 94 consisting of an omni wheel in a rotatable manner around a rotational center line extending in the fore and aft direction. An electric motor 96 is provided between the rear end of the tail wheel arm 92 and the tail wheel 94 to allow the tail wheel 94 to be selectively rotated about the rotational center line thereof. By thus actuating the electric motor 96, the vehicle may be steered in any desired direction. The tail wheel 94 includes a plurality of free rollers arranged around the periphery thereof, each free roller being rotatable around a rotational center line tangential to the periphery of the tail wheel 94 so that the tail wheel 94 may be dragged in the fore and aft direction without friction owing to the rotation of the individual free rollers engaging the road surface.

An electric box 98 accommodating electronic units such as an electronic control unit, a gyro sensor and motor drive unit is attached to a part of the body frame 10 located immediately above the main wheel 30. The electronic control unit controls the two electric motors 84 for the drive disks 70 to maintain the vehicle in an upright posture by executing a control process based on inverted pendulum control, and the electric motor 96 for the tail wheel 94 for the turning movement of the vehicle. The body frame 10 supports a battery for powering the electric motors 84 and 96 and the electronic units although not shown in the drawings.

When the two electric motors 84 for the drive disks 70 are rotated in the same direction at a same speed, the vehicle travels in the fore and aft direction owing to the rotation of the main wheel 30 around the laterally extending rotational center line thereof. At such a time, the driven rollers 60 on the main wheel 30 remain stationary in regard to the rotation thereof around the respective tangential lines.

When the two electric motors 84 for the drive disks 70 are rotated at a different speed or in different directions, the vehicle travels in an oblique direction owing to the lateral component of the drive force created by the rotation of the driven rollers 60 on the main wheel 30 which is in turn caused by the engagement between the drive rollers 78 and the driven rollers 60. When the rotational speeds of the electric motors 84 are the same but in the opposite directions, the vehicle is enabled to travel in the lateral direction owing to the rotation of the driven rollers 60 while the main wheel 30 remains stationary in regards to the rotation about the lateral axial line thereof.

Thus, by suitably actuating the electric motors 84 for the drive disks 70, the vehicle is able to travel linearly in any desired direction.

When the tail wheel 94 is rotatively actuated by the electric motor 96, the vehicle is caused to turn around a vertical line passing through the road contact point of the main wheel 30. In other words, any desired yaw movement of the vehicle may be achieved by suitably actuating the electric motor 96 for the tail wheel 94. Thus, by combining the control of the movement of the main wheel 30 and the control of the movement of the tail wheel 94, the vehicle is able to change both the travel direction and the heading of the vehicle at will.

As discussed earlier, in the frictional propulsion device of the illustrated embodiment, because the drive side contact circle D1 of the drive disks 70 is smaller than the driven side contact circle D2 of the main wheel 30, if the circumferential pitch of the drive rollers 78 is given, the number of the drive rollers 78 can be significantly reduced as compared to the case where D1=D2. In particular, the smaller the drive side contact circle D1 is, the fewer the required number of drive rollers 78 is.

Because the drive disks 70 are offset relative to the main wheel 30 such that the only those drive rollers 78 located in the proximity of the driven rollers 60 are in contact with the driven rollers 60, only those driven rollers 60 contacting the road surface are frictionally driven by the drive rollers 78 while the driven rollers 60 not contacting the road surface are not needlessly actuated by the drive rollers 78. Therefore, power loss is minimized, and the power efficiency of the frictional propulsion device can be improved.

Because the electric motors 84 are positioned in the crescent shaped space C created by dimensioning the drive disks 70 such that D1<D2, the gravitational center of the propulsion device can be lowered, and the overall height of the propulsion device can be minimized These factors contribute to the stability of the propulsion device or the vehicle equipped with the propulsion device in operation.

Because the two electric motors 84 are positioned symmetric to each other about the vertical line extending between the road contact point of the main wheel 30 and the center of the drive disks 70 as seen from a side, the lateral dimension of the propulsion device can be minimized so that the turning performance of the vehicle equipped with the propulsion device can be improved.

Furthermore, owing to the symmetric arrangement of the two electric motors 84, the overall gravitational center of the two electric motors 84 is located on the vertical line extending between the road contact point of the main wheel 30 and the center of the drive disks 70 as seen from a side, the propulsion device is balanced in the fore and aft direction so that the traveling stability of the vehicle equipped with the propulsion device can be improved.

Because the central axial line A of the support shaft 22 and the central axial line B of the main wheel 30 are in parallel to each other, and the imaginary planes containing the drive side contact circle and the driven side contact circle are both in parallel with the vertical plane, the lateral expanse of the two drive disks 70 is minimized so that the lateral dimension of the frictional propulsion device is reduced as compared to the case where the imaginary plan containing the drive side contact circle is tilted with respect to the vertical plane. Because the imaginary plane containing the drive side contact circle is perpendicular to the central axial line A of the support shaft 22, the electric motors 84 for driving the drive disks 70 can also be positioned horizontally, thereby eliminating the need for any special arrangement for mounting the electric motors 84 on the body frame 10.

Owing to the provision of the idler roller 102 which is located in an upper part of the main wheel 30, the lateral tilting movement of the main wheel 30 about the ground contact point or the roll movement of the main wheel 30 can be effectively prevented.

Furthermore, when the body frame 10 is lifted off the ground, the idler roller 102 prevents the main wheel 30 from sagging down from the body frame 10 so that the rider can carry the vehicle without any difficulty.

Because the free rollers 110 engage the inner periphery of the main wheel 30 in both front and rear parts of the main wheel 30, the yaw movement of the main wheel 30 about the vertical line passing through the ground contact point thereof can be effectively prevented.

When a rider is seated on the saddle 18, the weight of the rider is transmitted to the support shaft 22 via the frame 10 so that the free rollers 110 are pressed against the corresponding driven rollers 60, and the yaw movement of the main wheel 30 can be achieved in an even more favorable manner.

Because the arm 106 can pivot around the support shaft 22, even when the body frame 10 should tilt either in the forward or rearward direction, owing to the corresponding rotation of the arm 106 about the support shaft 22, the free rollers 110 are prevented from being pressed against the driven rollers 60 with an excessive pressure.

Figure 6:
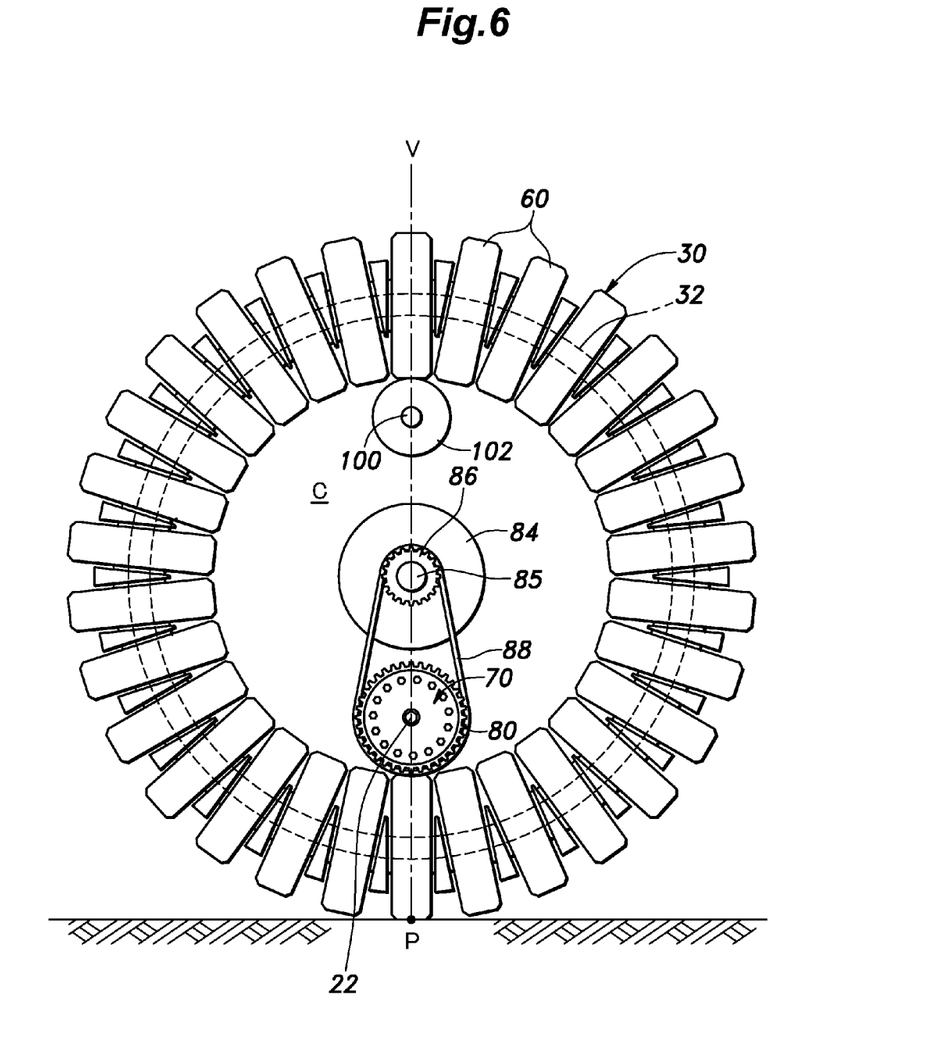
FIG. 6 is a view similar to FIG. 5 showing a second embodiment of the present invention.

FIG. 6 shows a second embodiment of the frictional propulsion device embodying the present invention. In FIG. 6, the parts corresponding to those shown in FIGS. 1 to 5 are denoted with like numerals, and such parts may be omitted in the following description to avoid redundancy.

In this embodiment, the central axial lines of the output shafts 85 of the electric motors 84 extend coaxially to each other, and are located on the vertical line passing through the ground contact point P of the main wheel 30.

In this embodiment also, the electric motors 84 are accommodated in the crescent shaped space C so that the gravitational center is lowered, and the overall height is minimized The overall gravitational center is located on the vertical line V passing through the ground contact point of the main wheel 30 so that the fore and aft balance of the propulsion device is favorably achieved, and the stability of the propulsion device in operation can be improved.

Although the present invention has been described in terms of preferred embodiments thereof, it is obvious to a person skilled in the art that various alterations and modifications are possible without departing from the scope of the present invention.

For instance, when the electric motors 84 consist of flat motors having a reduced axial length, the electric motors 84 may be entirely received in the crescent shaped space C as seen from the front. If the lateral dimensions of the driven pulleys 80 and the disk members 74 are reduced, the lateral dimension of the frictional propulsion device can be minimized.

Furthermore, the idler rollers 102 may also consist of simple cylindrical members, instead of hourglass shaped members, and a plurality of such idler rollers may also be positioned at circumferentially separated positions. The idler rollers 102 may also consist of sliders for preventing the roll and/or yaw movements of the main wheel 30, instead of free rollers. If desired, the driven pulleys 80 may have a substantially same diameter as the drive pulleys 86.

The invention claimed is:

1. A frictional propulsion device, comprising:
   a frame;
   a main wheel including an annular core member having a laterally extending central axial center line and a plurality of driven rollers each rotatably supported on the annular core member about a tangential line of the annular core member;
   a support shaft supported by the frame and extending laterally across a hollow interior of the main wheel;
   a pair of drive disks rotatably supported by the support shaft on either side of the main wheel, the drive disks being individually rotatable around a central axial line common to the support shaft;
   a plurality of drive rollers arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel;
   a drive unit mounted on the frame; and
   a transmission mechanism for transmitting power from the drive unit to the drive disks individually;
   wherein a diameter of a drive side contact circle defined by points on the drive disk at which the drive rollers contact the driven rollers is smaller than a diameter of a driven side contact circle defined by the points on the main wheel at which the driven rollers contact the drive rollers, and the drive disks are vertically offset relative to the main wheel so that only those drive rollers adjoining the main wheel are in contact with the driven rollers; and
   wherein the drive unit is positioned in a crescent shaped space defined between an outer peripheral part of the drive disks and an inner peripheral part of the main wheel as seen from a side.

2. The frictional propulsion device according to claim 1, wherein the drive unit includes a pair of electric motors which are angularly offset relative to each other about the central axial line of the drive disks.

3. The frictional propulsion device according to claim 2, wherein the electric motors are positioned symmetric to each other about a line connecting the central axial lines of the main wheel and the drive disks.

4. The frictional propulsion device according to claim 1, wherein the electric motors are positioned on a line connecting the central axial lines of the main wheel and the drive disks.

5. The frictional propulsion device according to claim 1, wherein the transmission mechanism includes a small pulley fitted on an output shaft of each electric motor, a large pulley coaxially fitted on the corresponding drive disk and a belt passed around the two pulleys.

6. The frictional propulsion device according to claim 1, further comprising a guide member supported by the frame for engaging the driven rollers that are not in contact with the drive rollers against yaw and/or roll movement of the main wheel relative to the frame.

7. The frictional propulsion device according to claim 3, wherein the guide member includes an arm rotatably supported by the support shaft or the frame around the central axial line of the support shaft and at least one free roller supported by the arm and making a rolling contact with the driven rollers on the main wheel.

8. The frictional propulsion device according to claim 7, wherein the arm extends away from the central axial line of the support shaft in two opposite directions, and at least one free roller is provided on each terminal end of the arm.

9. An omni-directional vehicle, comprising:
   the frictional propulsion device according to claim 1.

* * * * *